US012791047B2

(12) United States Patent
Fisher et al.

(10) Patent No.: US 12,791,047 B2
(45) Date of Patent: Nov. 10, 2026

(54) CLAMP APPARATUS

(71) Applicant: STORM ARMOUR, INC., Miami Beach, FL (US)

(72) Inventors: Mark Fisher, Bal Harbour, FL (US); Todd Michael Glaser, Palm Beach, FL (US); Ronald Simkins, Miami, FL (US); David Kreps, Miami Beach, FL (US); Werner Blumenthal, Miami, FL (US)

(73) Assignee: STORM ARMOUR, INC., Miami Beach, FL (US)

( * ) Notice: Subject to any disclaimer, the term of this patent is extended or adjusted under 35 U.S.C. 154(b) by 0 days.

(21) Appl. No.: 19/087,230

(22) Filed: Mar. 21, 2025

(65) Prior Publication Data

US 2026/0286992 A1 Sep. 24, 2026

(51) Int. Cl.

*F16B 2/06* (2006.01)
*E06B 7/23* (2006.01)
*E06B 7/26* (2006.01)

(52) U.S. Cl.

CPC ............ *F16B 2/065* (2013.01); *E06B 7/2316* (2013.01); *E06B 7/26* (2013.01)

(58) Field of Classification Search

CPC .......... F16B 2/065; E06B 7/2316; E06B 7/26; B25B 1/20; B25B 1/2457; B25B 3/00; B25B 5/067; B25B 27/00
USPC .................. 269/3, 6, 50, 53, 71, 73, 74, 272
See application file for complete search history.

(56) References Cited

U.S. PATENT DOCUMENTS 733,295 A 7/1903 Stites
1,570,451 A 1/1926 Simoneau
1,688,765 A 10/1928 Veras
3,263,366 A 8/1966 Woloohojian et al.
3,596,559 A * 8/1971 Gregersen .............. B23D 37/06 269/61
4,170,846 A 10/1979 Dumenil et al.
4,346,501 A 8/1982 Saiya
(Continued)

FOREIGN PATENT DOCUMENTS

CN 215979020 3/2022
CN 219471928 8/2023
(Continued)

OTHER PUBLICATIONS

Fisher, Mark.; International Search Report and Written Opinion for PCT Application No. PCT/US2025/012324, filed Jan. 21, 2025, mailed Jun. 6, 2025, 30 pgs.
(Continued)

*Primary Examiner* — Sarang Afzali
*Assistant Examiner* — Darrell C Ford
(74) *Attorney, Agent, or Firm* — Smith, Gambrell & Russell, LLP

(57) ABSTRACT

A clamp apparatus that facilitates the quick and easy installation and retention of foam compressible or compliant barriers while also being securable and easily removable when no longer in use. The apparatus includes a base configured to attach the device to a structure, such as but not limited to a sill. The device further includes a slider and an elevator, where the elevator is configured to raise and lower the slider relative to the base (vertical adjustment), as well as extend or retract the slider relative to the base (horizontal adjustment).

7 Claims, 16 Drawing Sheets

(56) References Cited

U.S. PATENT DOCUMENTS

| | | | | |
|---|---|---|---|---|
| 4,431,087 | A * | 2/1984 | Karol | B66B 7/02 238/337 |
| 5,038,644 | A * | 8/1991 | Delsack | B25G 1/043 7/165 |
| 5,336,179 | A | 8/1994 | Ryan | |
| 5,377,963 | A * | 1/1995 | Lehman | B25B 1/103 269/210 |
| 5,666,702 | A | 9/1997 | Ming-Chieh | |
| 6,149,114 | A | 11/2000 | Epping et al. | |
| 7,644,539 | B2 | 1/2010 | Baxter | |
| 9,016,510 | B2 | 4/2015 | Edwards | |
| 10,785,554 | B2 | 9/2020 | Mainini et al. | |
| 11,313,591 | B1 * | 4/2022 | Atia | F24S 25/636 |
| 11,808,292 | B2 * | 11/2023 | Khairnar | F16B 37/0871 |
| 12,234,684 | B2 | 2/2025 | Glaser et al. | |
| 12,312,859 | B2 | 5/2025 | Fisher et al. | |
| 12,627,252 | B2 * | 5/2026 | Kobayashi | F16B 2/065 |
| 2008/0277536 | A1 * | 11/2008 | Olle | F16B 37/0807 403/374.3 |
| 2010/0281659 | A1 * | 11/2010 | Ciobotaru | B66B 7/085 24/485 |
| 2015/0249423 | A1 * | 9/2015 | Braunstein | F16B 5/0685 52/173.3 |
| 2016/0067845 | A1 * | 3/2016 | Quaiz | B25B 5/006 29/559 |
| 2017/0063288 | A1 * | 3/2017 | Schuit | F24S 25/632 |
| 2019/0029404 | A1 | 1/2019 | Mainini et al. | |
| 2019/0381632 | A1 * | 12/2019 | Wang | B25B 5/102 |
| 2020/0173155 | A1 * | 6/2020 | Wisniewski | E03C 1/335 |
| 2023/0087436 | A1 | 3/2023 | Fisher et al. | |
| 2023/0338218 | A1 * | 10/2023 | Kovacs | A61G 13/101 |
| 2024/0157515 | A1 * | 5/2024 | Hanlon | B25B 1/2426 |
| 2025/0237106 | A1 | 7/2025 | Fisher et al. | |
| 2026/0286768 | A1 | 9/2026 | Fisher et al. | |

FOREIGN PATENT DOCUMENTS

| | | |
|---|---|---|
| EP | 1221529 | 7/2002 |
| EP | 4589110 | 7/2025 |
| JP | 2011051398 | 3/2011 |
| WO | 2025155959 | 7/2025 |

OTHER PUBLICATIONS

Fisher, Mark; Non-Final Office Action for U.S. Appl. No. 18/416,241, filed Jan. 18, 2024, mailed Jan. 28, 2026, 29 pgs.

Fisher, Mark.; Restriction Requirement for U.S. Appl. No. 18/416,241, filed Jan. 18, 2024, mailed Nov. 5, 2025, 9 pgs.

Fisher, Mark; Extended European Search Report for Serial No. 25158669.9, filed Jan. 20, 2025, mailed Jun. 30, 2025, 5 pgs.

Fisher, Mark; Final Office Action for U.S. Appl. No. 18/416,241, filed Jan. 18, 2024, mailed Jul. 7, 2026, 15 pgs.

Fisher, Mark.; Non-Final Office Action for U.S. Appl. No. 19/087,233, filed Mar. 21, 2025, mailed Aug. 6, 2026, 25 pgs.

* cited by examiner

CLAMP APPARATUS

CROSS-REFERENCE TO RELATED APPLICATIONS

None.

FIELD OF THE INVENTION

The present invention generally relates to clamp apparatuses and, more specifically, to an improved clamp apparatus for the easy and secure retention of devices that aid in the reduction of small debris and water intrusion through sliding glass door tracks during severe weather conditions.

BACKGROUND OF THE INVENTION

In high rise condominiums, townhouses, apartment buildings, and private residences there are no current practical and/or efficient ways to reduce the amount of water intrusion through sliding glass doors, and their tracks, during severe weather. Hurricane rated or not, most sliding glass doors slide on tracks that are built with weep holes, which allow water that has accumulated to drain out—but this is not the case in conditions with wind-driven rain. Under these severe conditions, weep holes do not function properly as the storm-force winds push the rainwater inside, through the gaps between the sliding glass door and the track. Commonly owned patent applications U.S. Ser. Nos. 17/428,113, 17/994,231, 18/416,241 and family applications and granted patents, are a marked improvement over the existing state of the art and could further benefit from an improved apparatus for the attachment and retention of said wind and rainstorm intrusion mitigation devices to existing structures such as, but not limited to, sliding door and window tracks and rails.

It would be advantageous, then, to have a device that facilitates the quick and easy installation and retention of track foam barriers while also being securable and easily removable when not in use.

There is a need, therefore, for a lightweight, compact device that provides a simple and easy method of attachment and retention to secure foam or other compressible barriers into the tracks of sliding glass doors and window tracks for customized installations.

SUMMARY OF THE INVENTION

We disclose a lightweight, compact, modular, and reusable device, that provides for the secure installation and retention of foam barriers to the tracks of a sliding glass door or window. The apparatus is designed to be used in conjunction with any compressible barrier and, at least, with the track foam barriers and related systems disclosed in commonly owned and co-pending U.S. patent application Ser. Nos. 17/428,113, 17/994,231, and 18/416,241. This disclosure includes improvements to the apparatus and system disclosed in this family of commonly owned and co-pending U.S. Patent Applications, all of which are incorporated by reference herein in their entireties.

Exemplary embodiments of the apparatus disclosed herein are disclosed and described in the context of a use case where the clamp apparatus is used to secure a compressible barrier into a channel defined by a sliding door or window sill or track. In some configurations, these sills are installed such that an upright wall portion (for example, a sill riser) of the sill is proud of an abutting floor. In other configurations, the sill is installed such that the upright wall portion of the sill is at or below the surface of an abutting floor. It will be understood, however, that the apparatus disclosed here may be suitable for installation in other environments and for other purposes and not limited to installation only with respect to a sliding glass door sill.

In embodiments, we disclose a device that facilitates the quick and easy installation and retention of track foam barriers while also being securable and easily removable when no longer in use. This device can comprise a base configured to attach the device to a structure, feature, or component, such as but not limited to a sill. The device further includes a slider and an elevator, where the elevator is configured to raise and lower the slider relative to the base (vertical adjustment), as well as extend or retract the slider relative to the base (horizontal adjustment).

As discussed, above, by way of example and not limitation, the device can be used to securely retain a foam barrier in a sliding door track or sill on the interior side. In such an installation, a foam barrier inserted into the door track is preferably subject to a downward force to ensure that it remains in the track as water, for example, is attempting to enter the track from the outside. The device is positioned such that the base is fixedly attached to the sill riser and the slider is above a portion of the foam barrier. The slider is then adjusted horizontally to be positioned above the foam barrier. Once in proper horizontal position, the slider can then be lowered via the vertical adjustment so as to contact and compress the foam barrier as desired. Features integral to the device ensure that the slider remains in position and imparts the desired force onto the foam barrier until removed.

Other embodiments of the device include additional floor attachment components to securely attach the device into position when, as in the case of a no-sill-riser, the base cannot be secured onto a track sill.

Although the invention is illustrated and described herein as embodied in a device for the installation of compressible barriers into sliding glass door tracks, the invention should not be limited to the details shown in those embodiments because various modifications and structural changes may be made without departing from the spirit and scope of the invention. Furthermore, while the invention is described within the context of a sliding glass door system, one of ordinary skill in the art will realize that the invention may be sized and configured as appropriate for other applications such as, but not limited to, windows, sliding doors without glass, and other similar structures.

The construction and method of operation and installation of the invention and additional objects and advantages of the invention are best understood from the following description of specific embodiments when read in connection with the accompanying drawings.

BRIEF DESCRIPTION OF THE DRAWINGS

In the accompanying figures, like reference numerals refer to identical or functionally similar elements throughout the separate views. The accompanying figures, together with the detailed description below, are incorporated in and form part of the specification and serve to further illustrate various embodiments and to explain various principles and advantages all in accordance with the present invention, in which.

Figure 1:
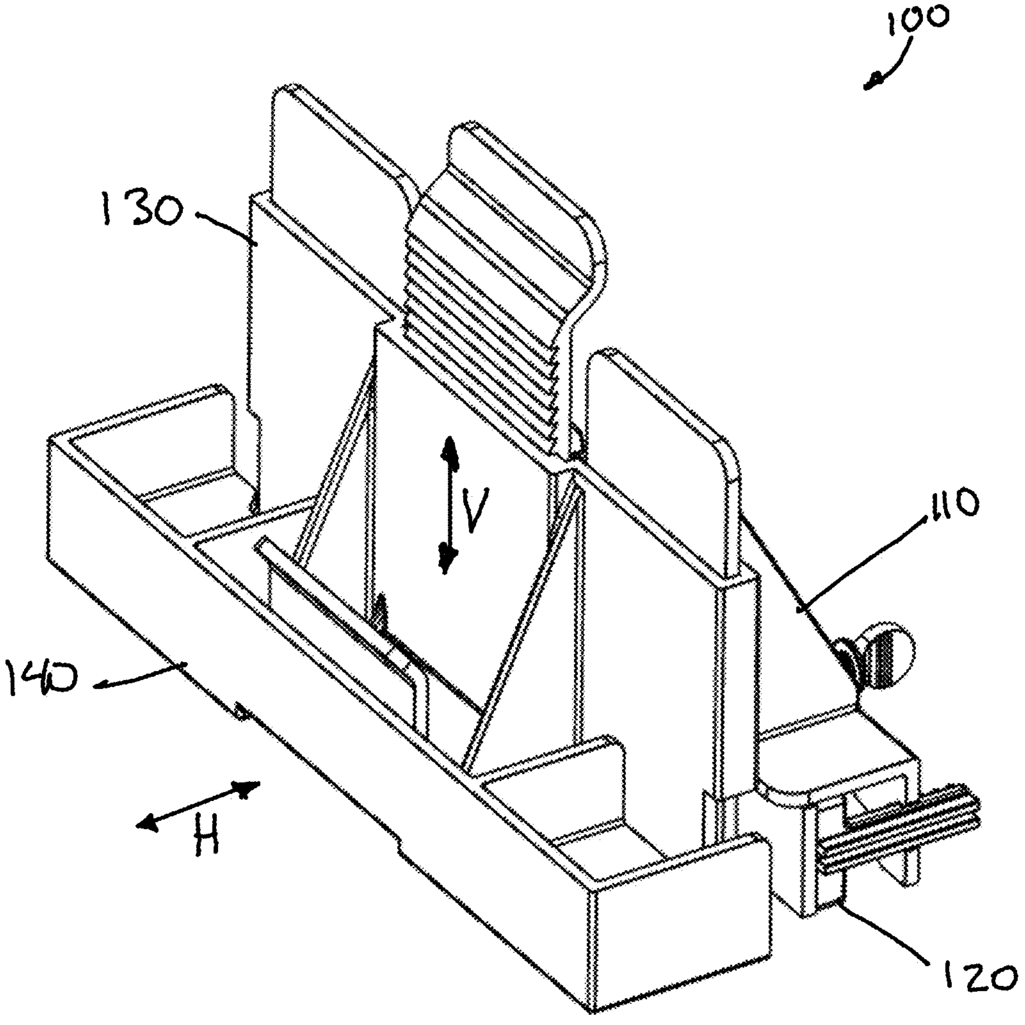
FIG. 1 shows an isometric front view according to an embodiment of the present invention.
Figure 2:
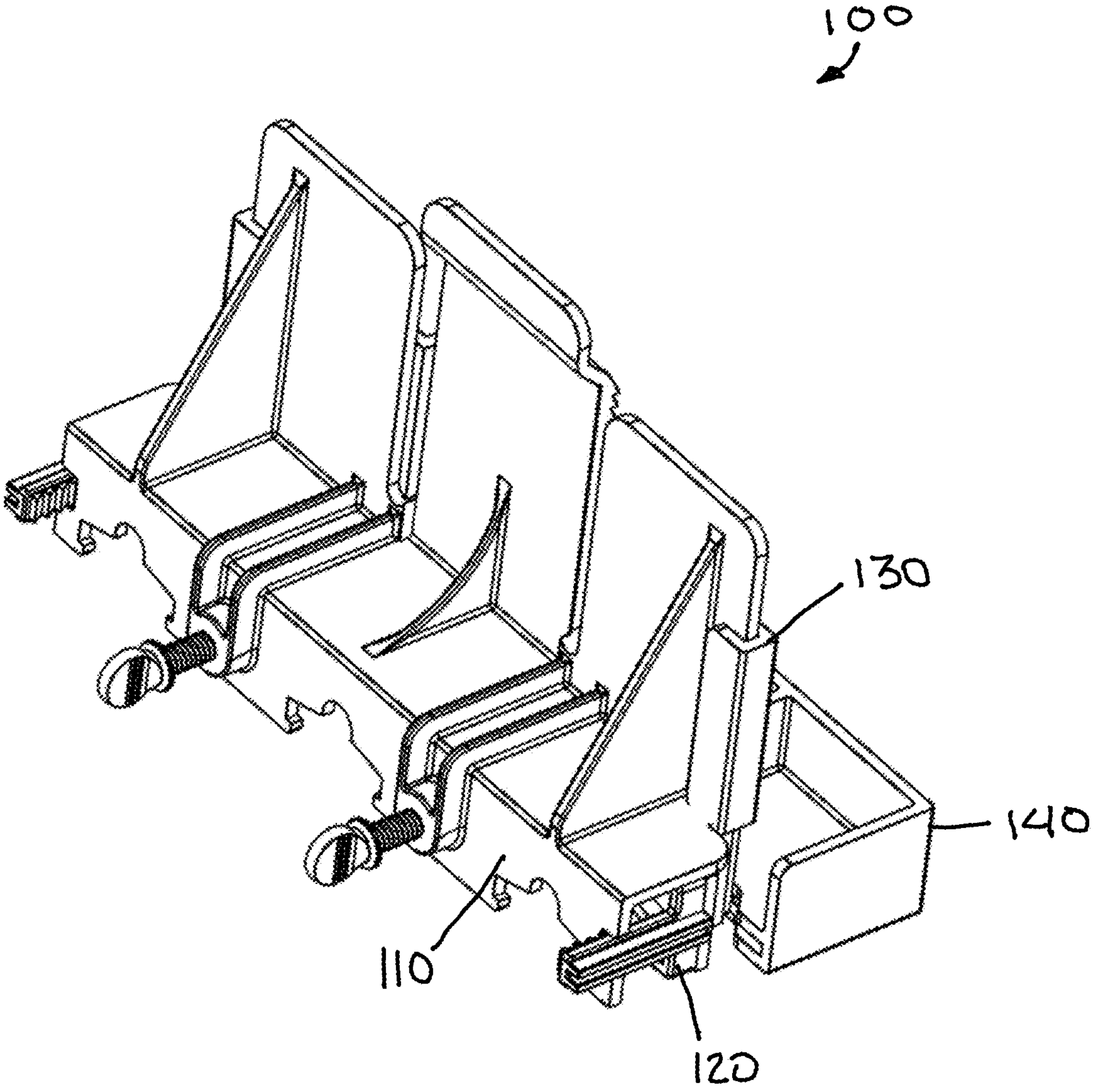
FIG. 2 shows an isometric back view of the invention shown in FIG. 1.
Figure 3:
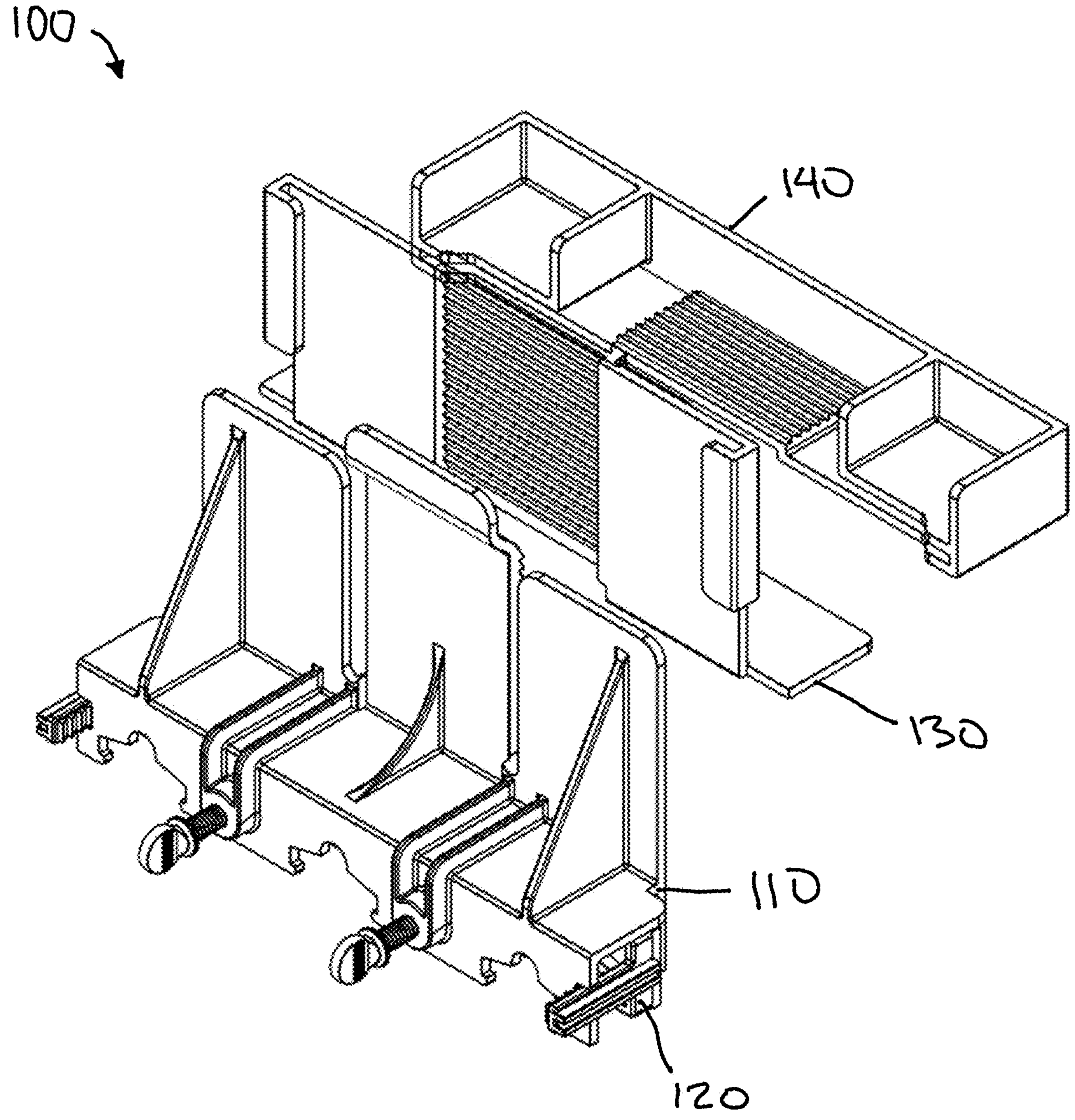
FIG. 3 shows an exploded view of the invention shown in FIG. 2.
Figure 4:
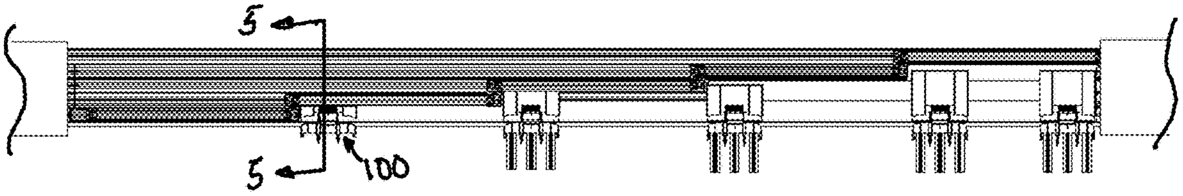
FIG. 4 shows a top view of embodiments of the invention installed in a sliding glass door system.
Figure 5:
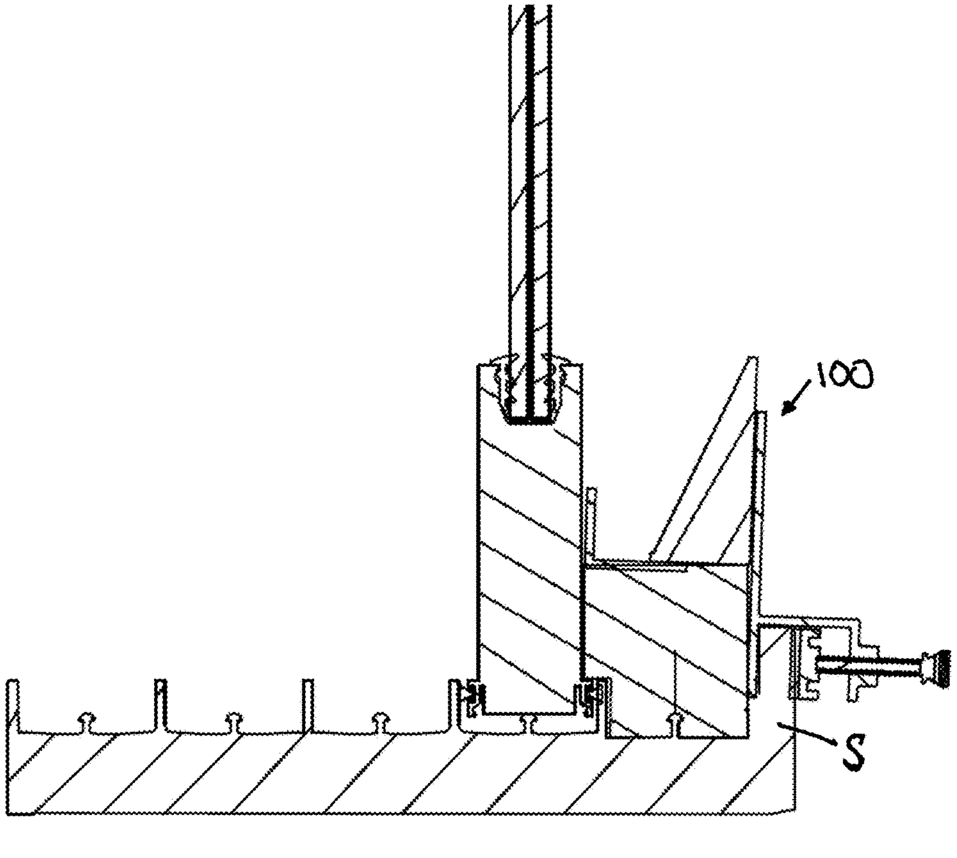
FIG. 5 shows a side cross sectional view of FIG. 4.
Figure 6:
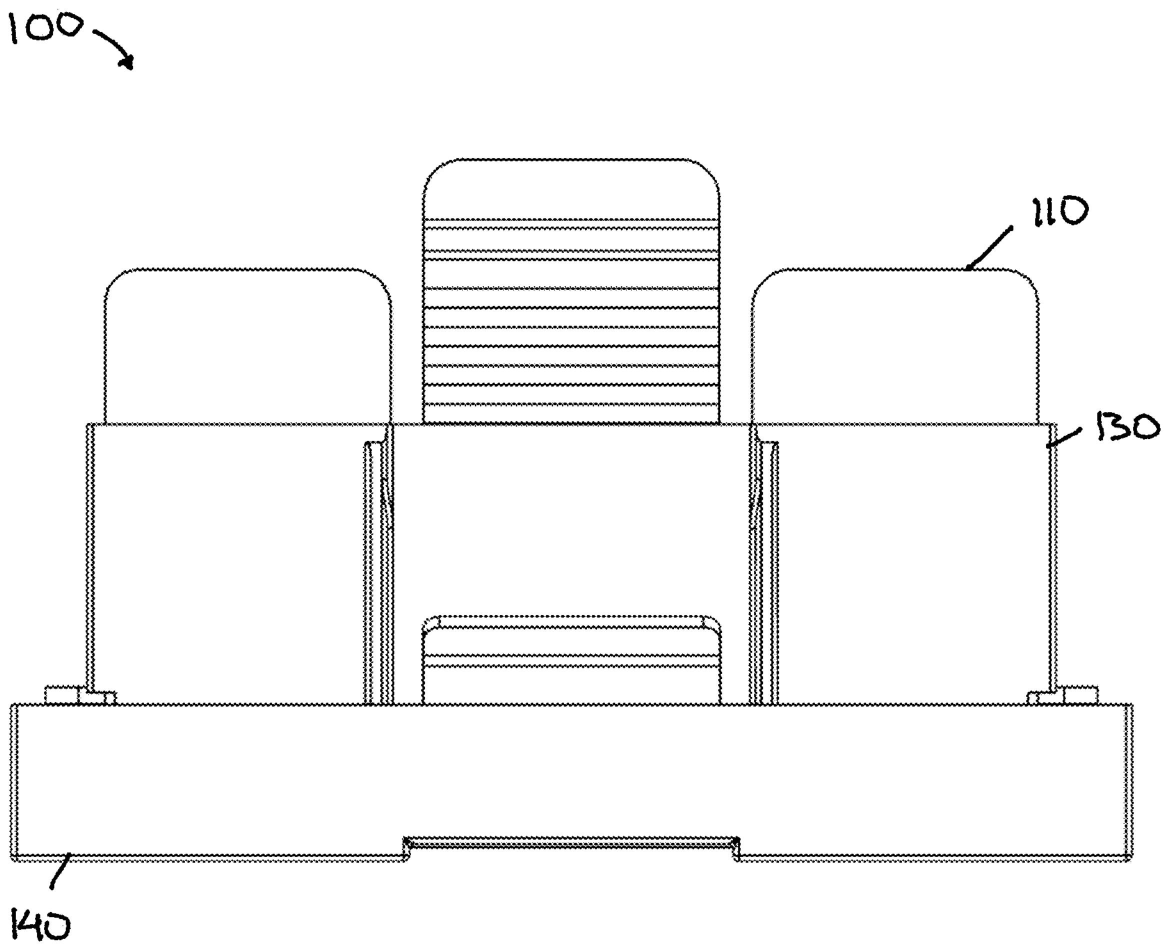
FIG. 6 shows a front view of FIG. 1.
Figure 7:
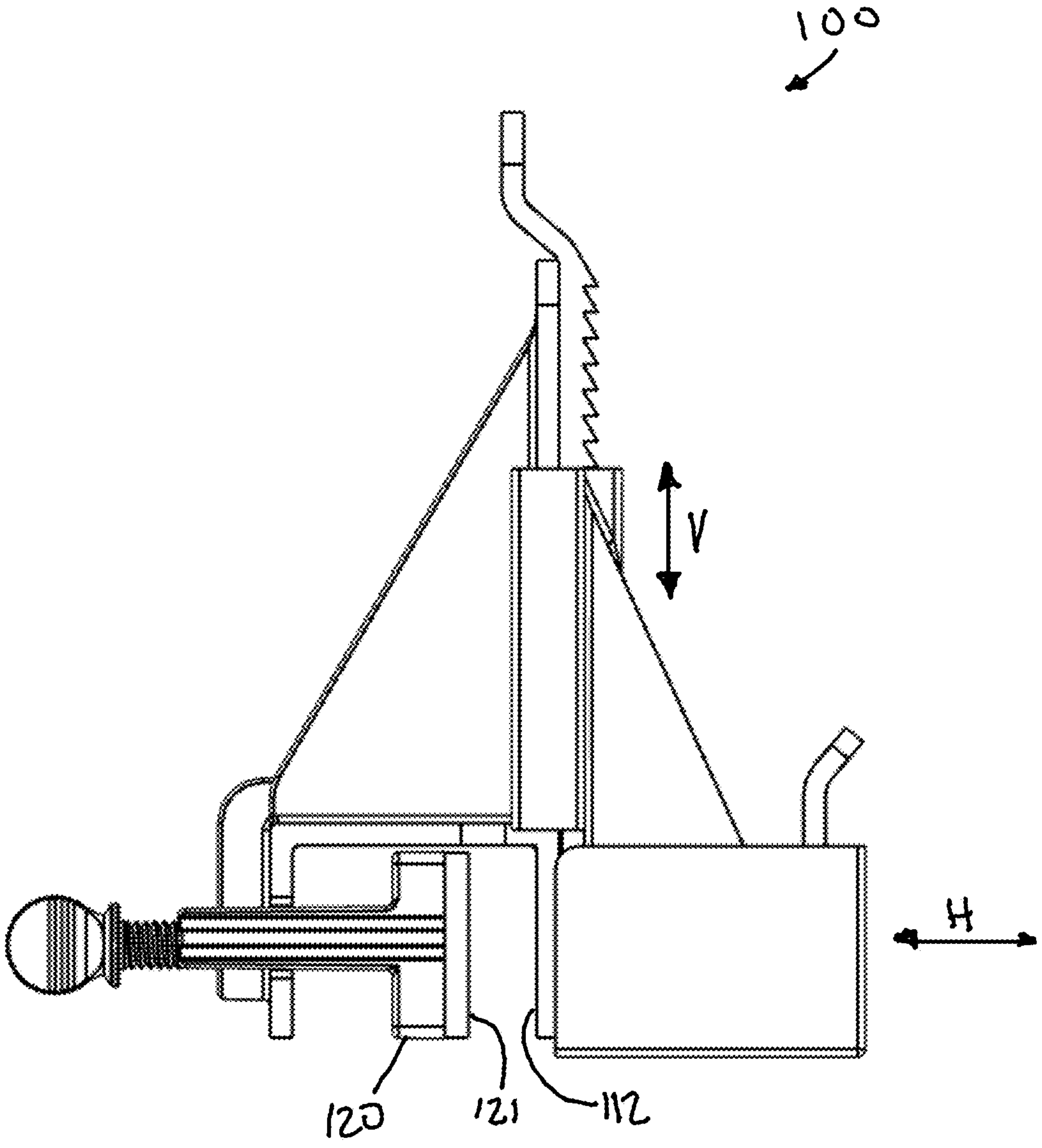
FIG. 7 shows a side view of FIG. 1.
Figure 8:
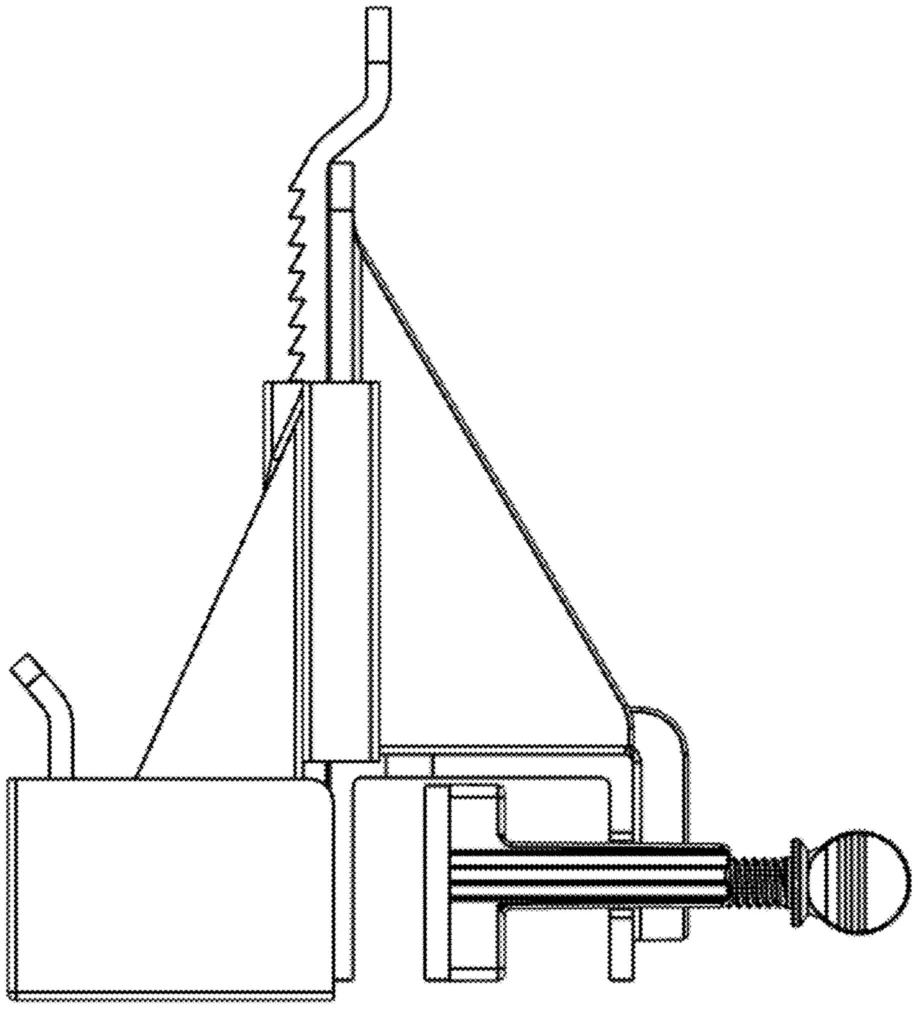
FIG. 8 shows an opposite side view of FIG. 1.
Figure 9:
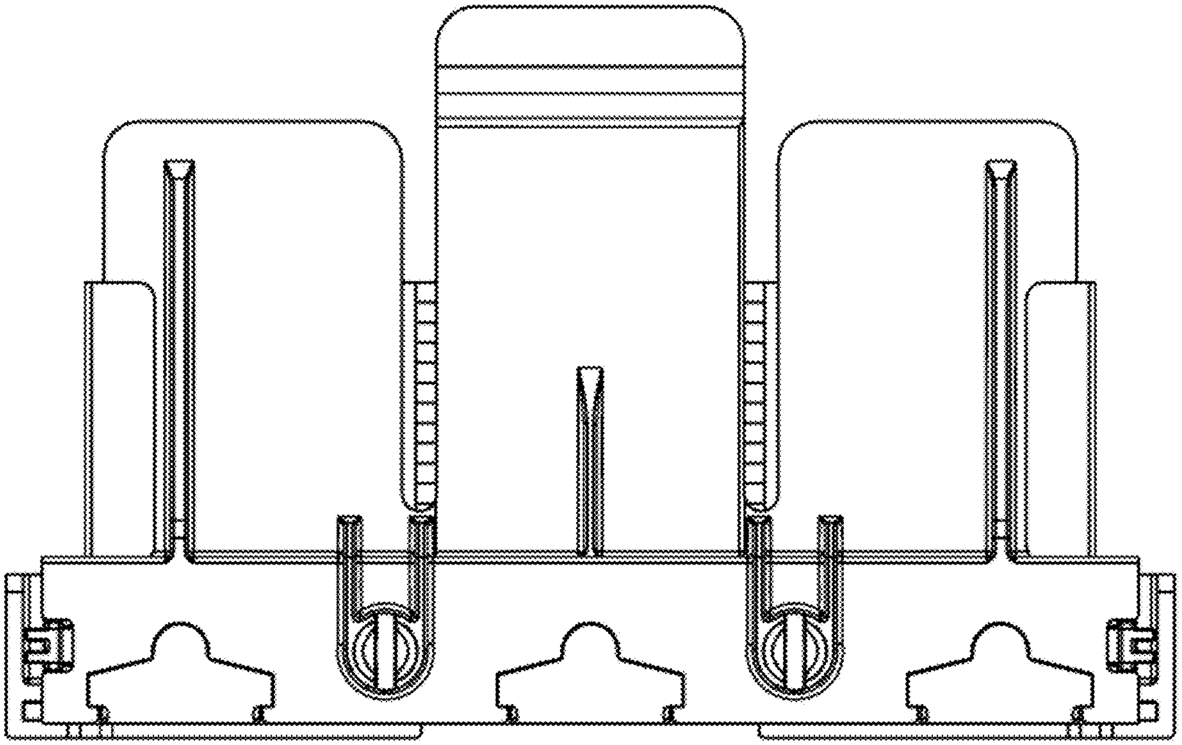
FIG. 9 shows a back view of FIG. 1.
Figure 10:
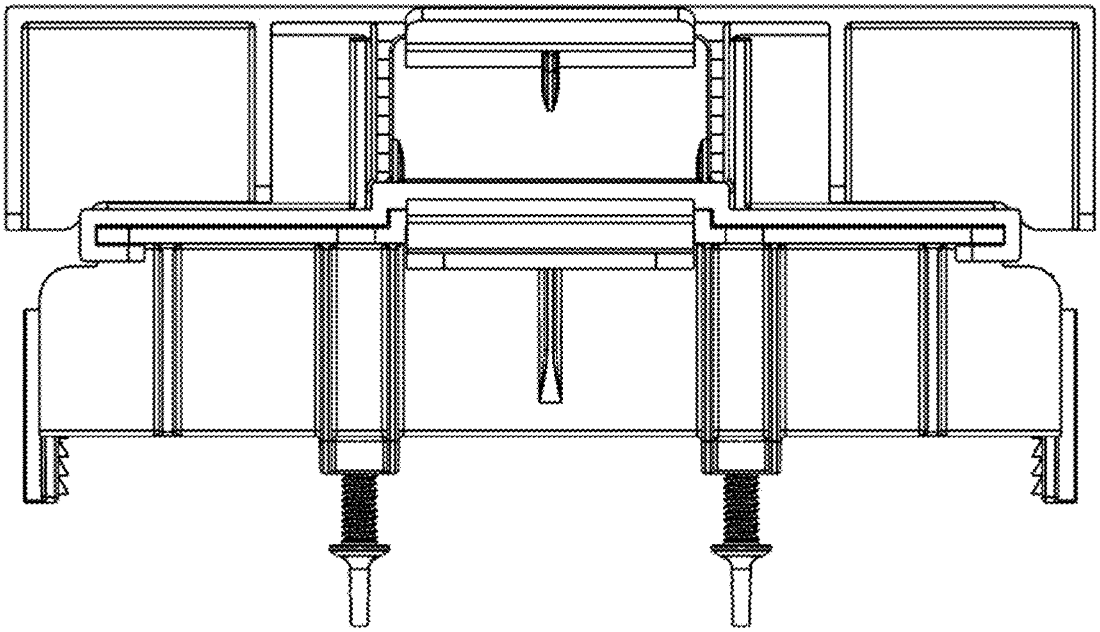
FIG. 10 shows a top view of FIG. 1.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

The present disclosure is not a literal description of all embodiments of the invention. Also, the present disclosure is not a listing of features of the invention which must be present in all embodiments. Furthermore, various figures depict structures such as doors, glass, tracks, panels, sills, frames, and floors in order to show the invention in a representative installation environment and for context. These structures are depicted for reference only and, unless otherwise expressly claimed, form no part of the invention and are not intended to limit the scope of the claims in any way.

Non-Limiting Definitions

The title of the present application and headings of sections provided in the present application are for convenience only, and are not to be taken as limiting the disclosure in any way.

In this specification and in the appended claims and drawings, words and phrases have the meanings commonly attributed to them in the relevant art except as otherwise specified herein. The terminology used herein is for the purpose of describing particular embodiments only and is not intended to be limiting of the disclosure.

The following non-limiting definitions are provided as a guide to interpreting the present invention:

The terms “a”, “an” and “the” mean “one or more”, unless expressly specified otherwise. As used herein, the singular forms “a”, “an” and “the” are intended to include the plural forms as well, unless the context clearly indicates otherwise.

The term “plurality” means “two or more”, unless expressly specified otherwise.

The term “herein” means “in the present application, including anything which may be incorporated by reference”, unless expressly specified otherwise.

The phrase “at least one of”, when such phrase modifies a plurality of things (such as an enumerated list of things) means any combination of one or more of those things, unless expressly specified otherwise. For example, the phrase “at least one of a widget, a car and a wheel” means either (i) a widget, (ii) a car, (iii) a wheel, (iv) a widget and a car, (v) a widget and a wheel, (vi) a car and a wheel, or (vii) a widget, a car and a wheel. The phrase “at least one of”, when such phrase modifies a plurality of things does not mean “one of each of” the plurality of things.

Numerical terms such as “one”, “two”, etc., when used as cardinal numbers to indicate quantity of something (e.g., one widget, two widgets), mean the quantity indicated by that numerical term, but do not mean at least the quantity indicated by that numerical term. For example, the phrase “one widget” does not mean “at least one widget”, and therefore the phrase “one widget” does not cover, e.g., two widgets.

The phrase “based on” does not mean “based only on”, unless expressly specified otherwise. In other words, the phrase “based on” describes both “based only on” and “based at least on”. The phrase “based at least on” is equivalent to the phrase “based at least in part on”.

The term “e.g.” and like terms mean “for example”, and thus does not limit the term or phrase it explains. For example, in the sentence “the computer sends data (e.g., instructions, a data structure) over the Internet”, the term “e.g.” explains that “instructions” are an example of “data” that the computer may send over the Internet, and also explains that “a data structure” is an example of “data” that the computer may send over the Internet. However, both “instructions” and “a data structure” are merely examples of “data”, and other things besides “instructions” and “a data structure” can be “data”.

The term “respective” and like terms mean “taken individually”. Thus if two or more things have “respective” characteristics, then each such thing has its own characteristic, and these characteristics can be different from each other but need not be. For example, the phrase “each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

The terms "including", "comprising" and variations thereof mean "including but not limited to", unless expressly specified otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "product" means any machine, manufacture, and/or composition of matter, unless expressly specified otherwise.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The term "foam" is used interchangeably with the term "compressible barrier" and is used in reference to a component (or group of components) that can be inserted into sills or rails in order to fill gaps and spaces therein so as to provide a physical barrier to mitigate liquid intrusion.

The term "severe weather condition", including grammatical equivalents, is used herein to describe an environmental event-either natural or man-made-whereby water (or other liquid), and possibly debris (as defined below), are driven by wind forces to accumulate and pass through a given barrier for a structure-here, a sliding glass door riding in a track, for example—into the interior of the structure, such intrusion causing damage to the interior of the structure. The term "severe weather condition" is not meant here to imply any particular meteorological category of severity—tropical storm, hurricane, etc. . . . —but merely describes, generally, an event of sufficient capability to cause unwanted water intrusion.

The terms "rain" and "water" are meant here to include any wind-driven liquid. This could include, but is not limited to, water, seawater, pool water, and rainwater. While the invention described may indeed have some effectiveness with respect to rising or standing water (such as in a flooding or pooling condition), that is not within the scope of the terms "rain", "water", or equivalents, as used herein. The use of the term "rain", "water", or equivalents in a claim are for description and context and are not meant to limit the claim in any way.

The term "debris" means any solid, i.e. non-liquid, matter that is capable of clogging up the track, weep holes, or equivalent structure. The term "debris", as used herein, is not meant to include large, wind-borne, matter that poses an adverse impact risk to the protected structure. For example, the invention disclosed here is not intended to provide impact resistance against large flying debris that could break or otherwise damage a sliding glass door, rather, it is typically encountered as dirt, sand, leaves, or other similar material that could accumulate in or around a track and clog the weep holes preventing proper drainage. As such, a person ordinarily skilled in the art would not consider shutters, impact panels, or other similar structures as being equivalent substitutes, or even in the same category or field of endeavor, as the present invention.

The term "extrusion" or "extruded" is used herein to describe a part, component, or feature that is principally described by a two-dimensional geometry that is projected into a third dimension along a given trajectory. For example, a cylinder may be here described as an extruded circle. This use of the term "extruded", "extrusion", or grammatical equivalents, is not meant in any way to limit the invention to a particular manufacturing method. An "extrusion" or "extruded profile" here may be, for example, machined, molded, cast, or forced through a die and cut to a length as in a traditional extrusion manufacturing method. Where a particular figure or drawing displays only the two-dimensional profile or cross-section, it is for compactness of disclosure only as the "extruded" view is readily known by the ordinarily skilled artisan. No limitation, disclaimer, or surrender of claim territory is intended through this economy of disclosure.

Directional terms such as, but not limited to, "up", "down", "in", and "out" or "vertical" and "horizontal" are used herein to describe movement or position relative to the base component. In a typical installation condition, as is shown in the various non-limiting embodiment and accompanying figures, where the base component is configured to be attached to a sill or track adjacent to a floor, the term "horizontal" is to be understood as being in a plane substantially parallel to the floor and the term "vertical" is to be understood as being in a plane that is substantially orthogonal to the floor and oriented along the direction of the sill or track. The terms "up" and "down" refer to directions along the "vertical" and "in" and "out" refer to directions along the "horizontal", substantially orthogonal to the "vertical".

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein. While certain aspects of conventional technologies and methods in the relevant art have been discussed to facilitate disclosure of the invention, Applicant in no way disclaims these technical aspects or methods, and it is contemplated that the claimed invention may encompass one or more of the conventional technical aspects or methods discussed herein.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Specifically, component names, types, and values, as depicted in the exemplary schematic diagrams, are not intended to limit the scope of the present invention and are presented only as possible embodiments.

Clamp Apparatus 100

Herein is disclosed an inventive clamp apparatus that is an improvement over the prior art. The inventive clamp apparatus may be used singly, or in combination with multiple clamps as needed to correspond to the number or length of barriers to be secured in an installation.

Referring now to the figures in general, and FIGS. 1-10, in particular, here is disclosed a preferred embodiment of a clamp apparatus 100, according to an aspect of the invention. Clamp apparatus 100 is comprised of a base 110, a pusher assembly 120, an elevator 130, and a slider 140. The pusher assembly 120 is attached to the base 100 in, preferably, horizontally adjustable relation thereto. Elevator 130 is slidingly attached to base 110 and constrained to vertically adjustable displacement V relative to the base 110. The slider 140 is slidingly attached to the elevator 130 and constrained to horizontally adjustable displacement H relative to the elevator 130.

Base 110

Figure 13:
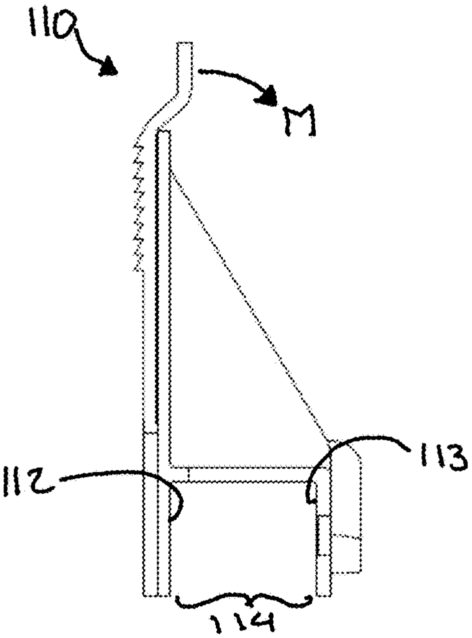
FIG. 13 shows a side view of FIG. 12.
Figure 14:
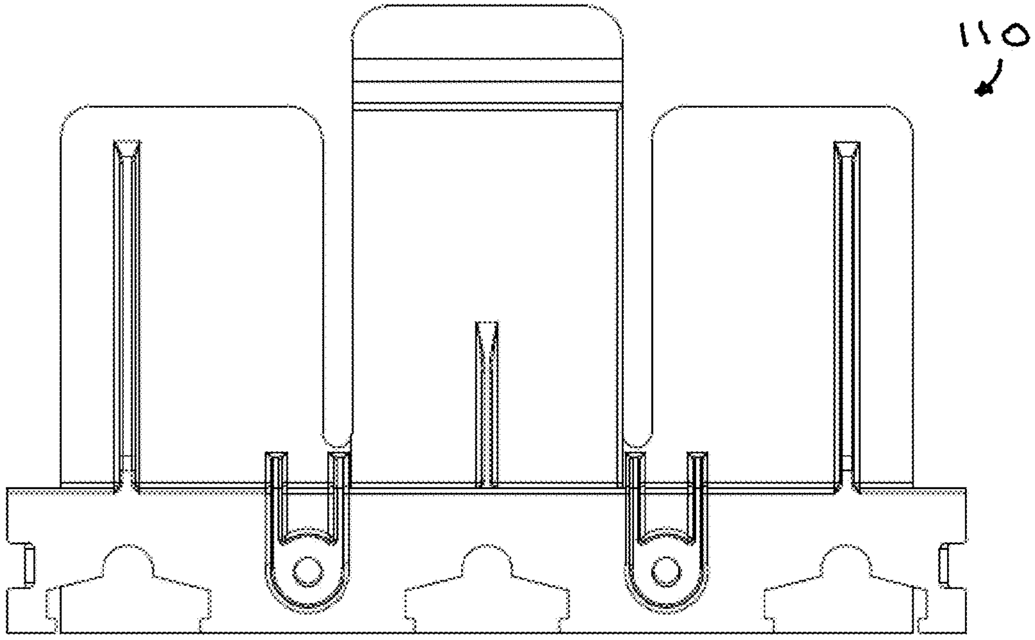
FIG. 14 shows a back view of FIG. 12.

As shown in FIG. 13, an embodiment of base 110 has a clamp jaw 112 and an opposed clamp wall 113 defining a clamp opening 114. The clamp opening 114 is configured to accept a structure S in inserted relation (see FIG. 5).

Figure 12:
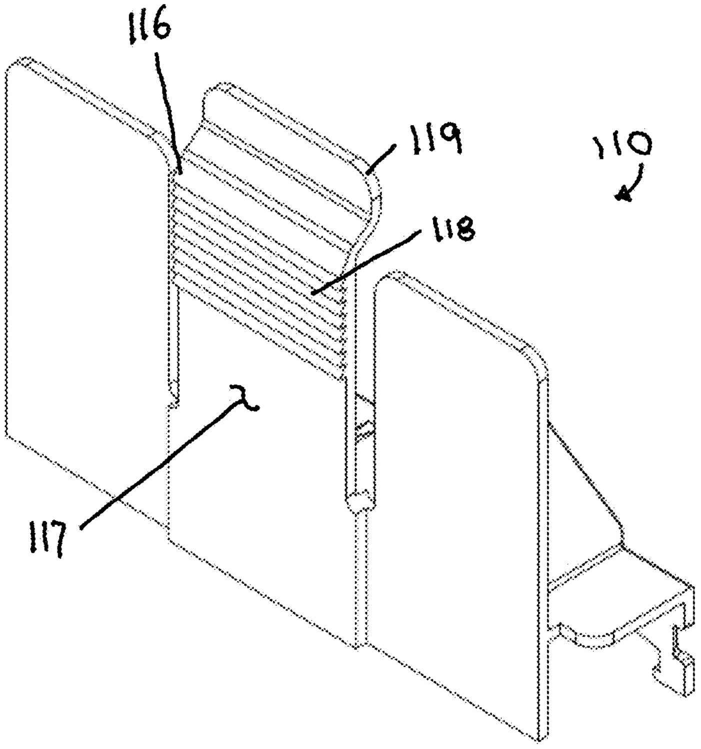
FIG. 12 shows a front isometric view of a base according to an embodiment.

Base 110 further has a vertical adjuster 116. See FIG. 12. In embodiments, the vertical adjuster 116 is disposed on the base 110 in a substantially vertical orientation relative to the base such as on vertical face 117. The vertical adjuster 116 is configured to interact with mating features on the elevator 130 such that elevator 130 is substantially free to move in a downward direction but is restricted from moving up without disengaging the vertical adjuster 116. Vertical adjuster 116 can include locking element 118 and release element 119. Locking element 118 is shown in FIG. 12 as a series of ratchet teeth, however, it will be clear to a person of ordinary skill in the art that other embodiments may include structures such as detents or other mechanical retention components. Similarly, release element 119 is shown as a handle that can be selectively moved in direction M (see FIG. 13) to disengage mated ratchet teeth, but buttons, latches, or other similar mechanical engagement/disengagement devices may be incorporated and still remain within the spirit and scope of the disclosure.

Pusher Assembly 120

The pusher assembly 120 provides a clamping force to attach the clamp apparatus 100 onto a structure S. Pusher assembly 120 is operatively connected to the base 100 such that a pusher surface 121 is configured to be opposite and parallel to clamp jaw 112 and disposed within clamp opening 114 between clamp jaw 112 and clamp wall 113. Pusher surface 121 is further configured to be selectively advanced towards clamp jaw 112 and impart a clamping force F onto a structure S captured therebetween.

In embodiments, the pusher assembly includes a threaded portion and a head, pad, or grip. The threaded portion is configured to be threadingly engaged with a mating threaded portion of the base 110 such that turning the pusher assembly advances the head, pad, or grip part of the pusher assembly to a closed (or clamped) aspect or retracts the head, pad, or grip part of the pusher assembly to an open (or unclamped) aspect relative to the base 110. Single or multiple pusher assemblies may be assembled onto the base to create a clamping solution as desired.

Figure 11:
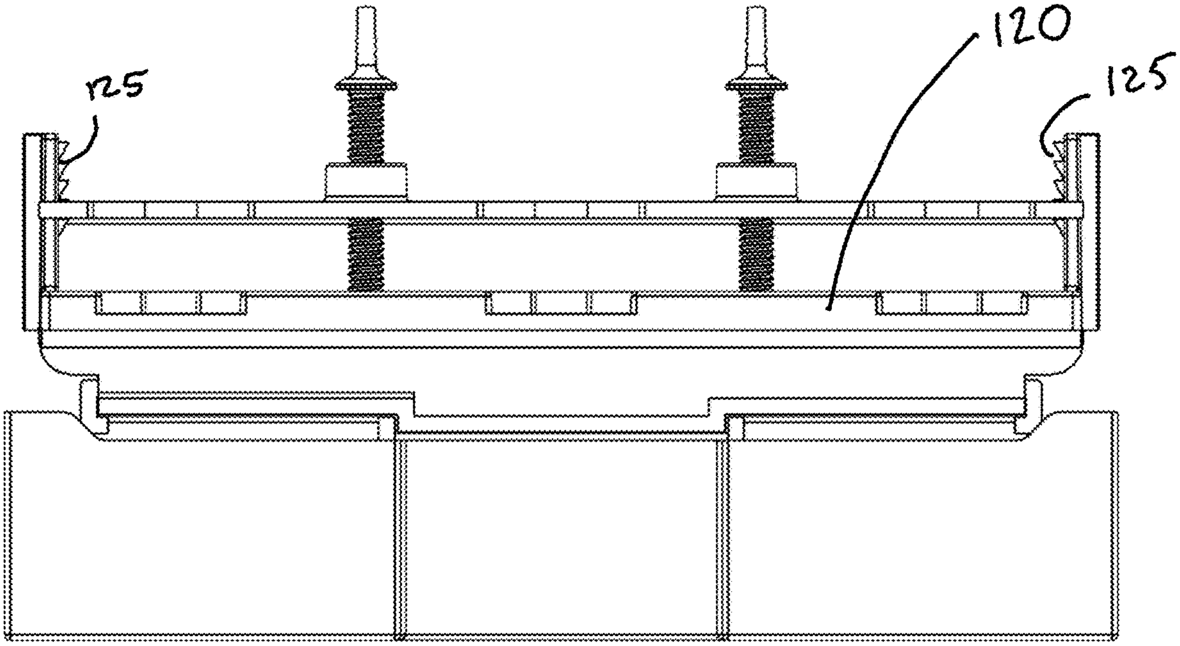
FIG. 11 shows a bottom view of FIG. 1.

In other embodiments, the pusher assembly 120 includes a pusher surface that can be coextensive with the base and engaged with the base by tightening one or more thumbscrews (see FIG. 11). The pusher surface may also include or more ratcheting surfaces 125 configured to engage with the base thereby permitting movement on one direction and restricting movement in an opposite direction.

In yet further embodiments, the pusher surface 121 may comprise a pad or grip surface.

Elevator 130

Figure 15:
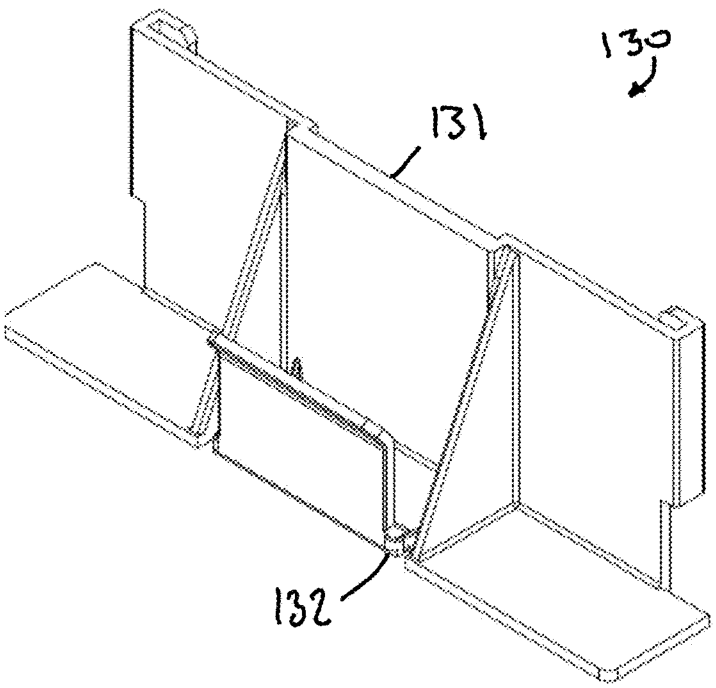
FIG. 15 shows a front isometric view of an elevator according to an embodiment.
Figure 16:
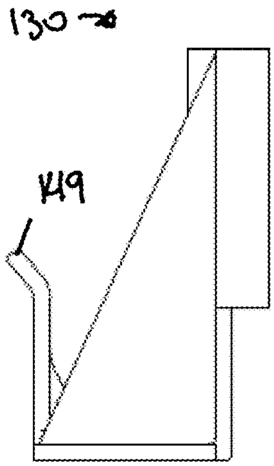
FIG. 16 shows a side view of FIG. 15.
Figure 17:
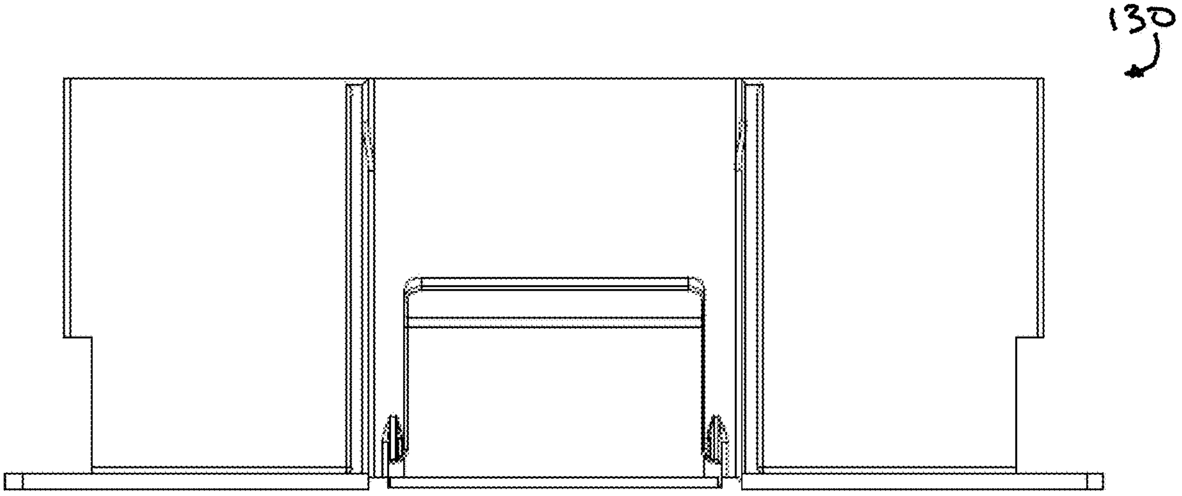
FIG. 17 shows a front view of FIG. 15.
Figure 18:
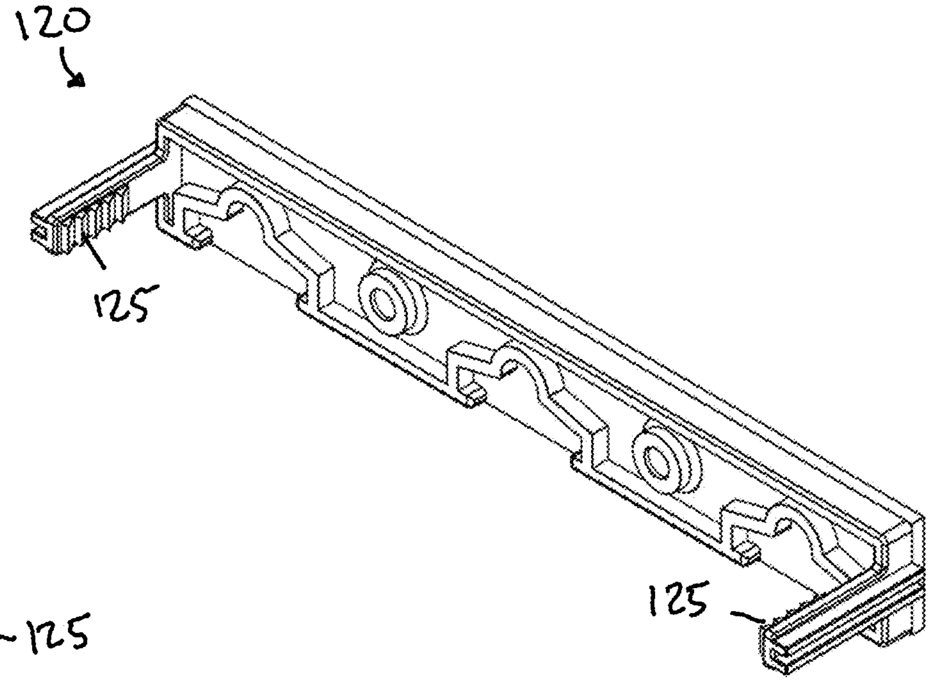
FIG. 18 shows an isometric front view of a pusher according to an embodiment.
Figure 19:
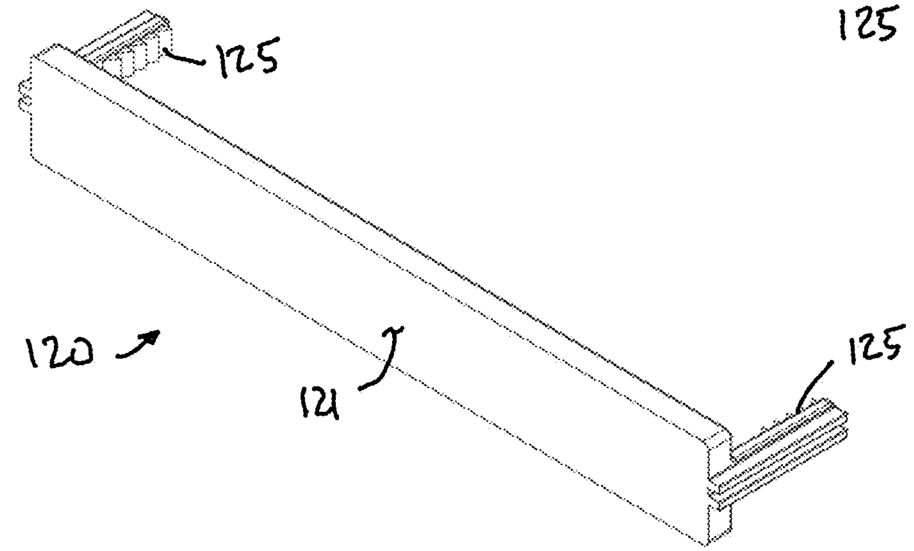
FIG. 19 shows an isometric back view of the pusher of FIG. 18.

The elevator 130 is configured to slidingly engage in a vertical aspect with respect to base 110 and includes one or more features that are configured to interact with the vertical adjuster 116. By way of example and not limitation, elevator 130 can include one or more protrusions that are configured to engage with locking element 118 and be disengaged by action of release element 119. In the embodiments shown in FIGS. 15-17, elevator 130 includes first protrusion 131 that interacts with ratchet 118 such that elevator 130 is free to move in a downward direction V but is impeded from moving in an upward direction V' until the release element 119 is acted upon to disengage the locking element 118.

The elevator 130 is further configured to slidingly engage in a horizontal aspect with respect to slider 140 and includes one or more features that are configured to interact with the horizontal adjuster 146. By way of example and not limitation, slider 140 can include one or more protrusions 132 that are configured to engage with horizontal locking element 148 and be disengaged by action of horizontal release element 149. In the embodiments shown in FIGS. 15-17, slider 140 includes first protrusion 132 that interacts with ratchet 148 such that slider 140 is free to move in a horizontal direction H (away from the base 130) but is impeded from moving in a horizontal direction H' (towards the base) until the horizontal release element 149 is acted upon to disengage the horizontal locking element 148.

Slider 140

Figure 20:
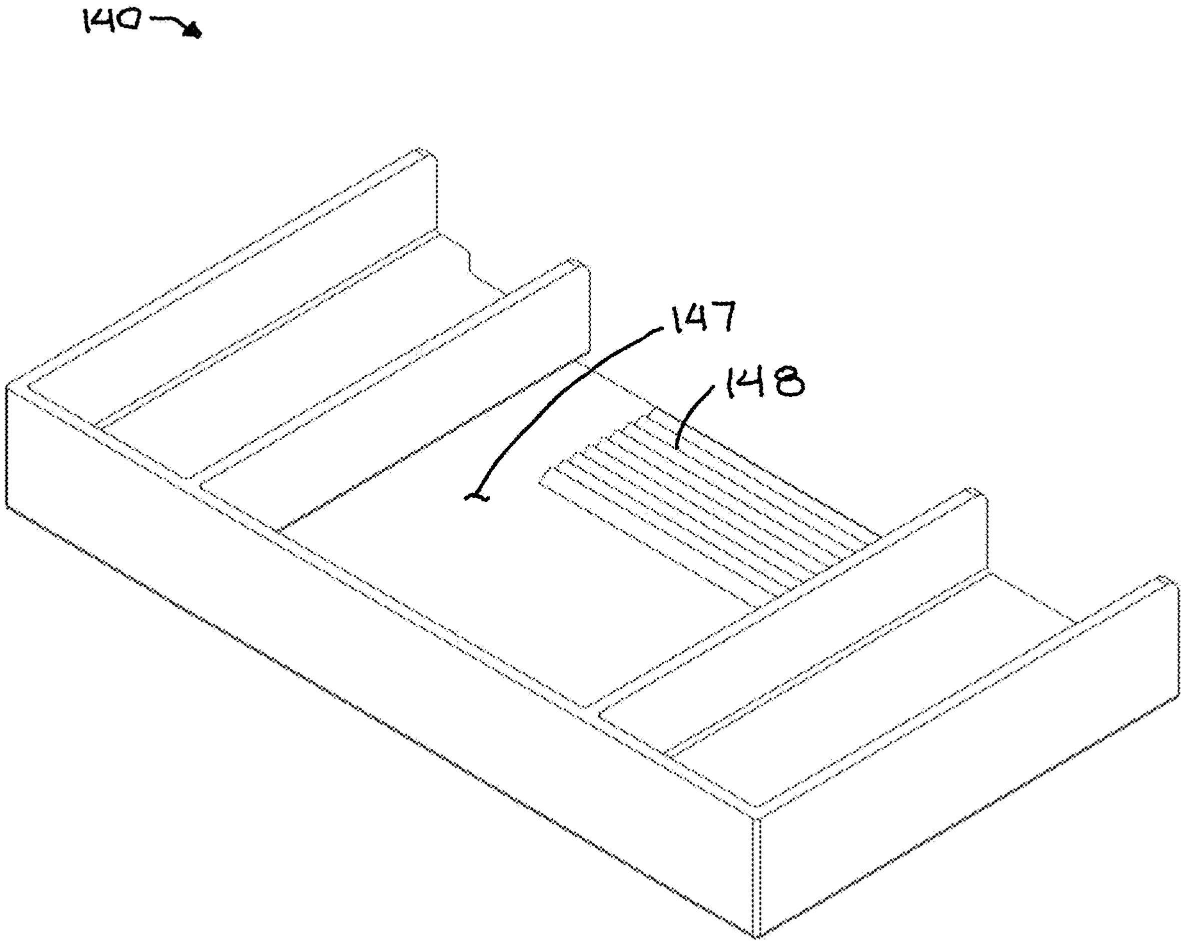
FIG. 20 shows an isometric front view of a slider according to an embodiment.

Slider 140 is slidingly connected to the elevator 130 and includes a horizontal adjuster 160. In embodiments, the horizontal adjuster 146 is disposed on the slider 140 in a substantially horizontal orientation relative to the base such as on horizontal face 147. The horizontal adjuster 146 is configured to interact with mating features on the elevator 130 such that slider 140 is substantially free to move in a horizontal direction away from the base 110, but is restricted from moving back towards the base 110 without disengaging the horizontal adjuster 146. Horizontal adjuster 146 can include horizontal locking element 148 and horizontal release element 149. Horizontal locking element 148 is shown in FIG. 20 as a series of ratchet teeth, however, it will be clear to a person of ordinary skill in the art that other embodiments may include structures such as detents or other mechanical retention components. Similarly, horizontal release element 149 is shown as a handle that can be selectively moved to disengage mated ratchet teeth, but buttons, latches, or other similar mechanical engagement/disengagement devices may be incorporated and still remain within the spirit and scope of the disclosure.

OTHER EMBODIMENTS

Figure 21:
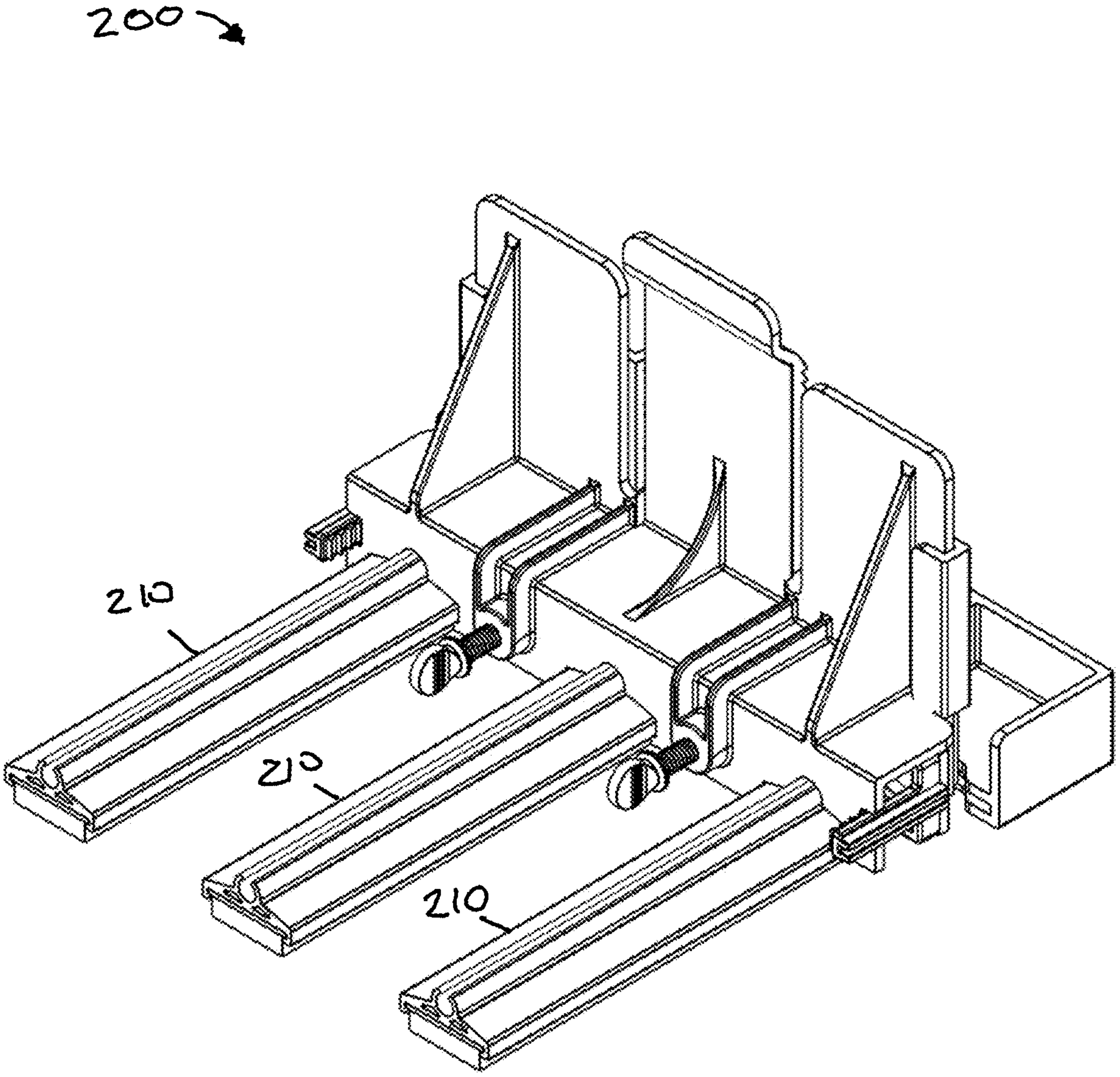
FIG. 21 shows an isometric back view of another embodiment of the apparatus.
Figure 22:
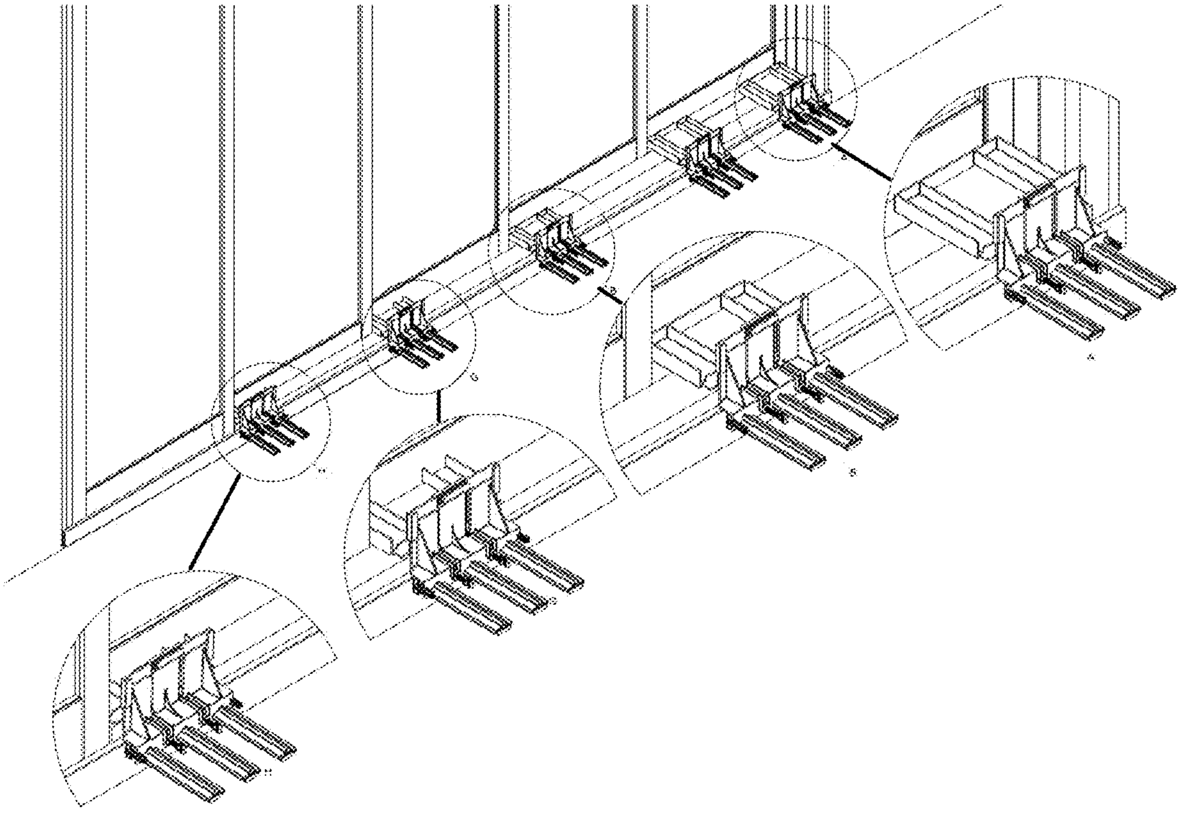
FIG. 22 is a composite view showing various embodiments of the apparatus as installed.

In other embodiments, the clamp apparatus 200 provides an attachment mechanism by which a foam barrier may be secured in relation to a sliding door track or similar structure where there is no structure capable of being clamped on to. (See FIG. 21.) In these situations, one or more floor attachment assembly 210 can be securely attached to a surface, such as a floor, and the one or more attachment assembly can attach to the base in inserted relation thereto.

In yet further embodiments, a variety of base lengths, attachment number and methods, elevator sizes, and slider sizes can be included in a system or kit in order to permit flexibility to accommodate varying installation conditions.

In any embodiment, the clamp apparatus, and its various parts and components, can be manufactured out of plastics, metals, or other suitable materials or combinations of materials.

Method 1000

A method of using embodiments of the clamp apparatus, as disclosed and described herein, includes the steps of:

Providing at least one clamp apparatus having at least a base, an elevator, a pusher assembly, and a slider;

Securing each clamp apparatus to a structure by securing the pusher assembly to a closed (clamped) position;

Adjusting the horizontal position of the slider relative to the base; and

Adjusting the vertical position of the slider relative to the base.

Additional method steps may include securing one or more floor attachment to a floor structure and mounting the clamp apparatus securely to the one or more floor attachment.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. In particular, features from one embodiment can be used with another embodiment. The embodiments were chosen and described to best explain the principles of the disclosure and the practical application, and to enable others of ordinary skill in the art to understand the invention for various embodiments with various modifications as are suited to the particular use contemplated.

The invention claimed is:

1. A clamp apparatus comprising:

a base configured to be secured to a structure, wherein the base further includes a vertical adjuster, and wherein the vertical adjuster comprises a ratchet and a handle;

an elevator mounted to the base and vertically adjustable relative to the base;

a pusher assembly coupled to the base and configured to engage the structure to secure the base thereto; and a slider mounted to the elevator and horizontally adjustable relative to the elevator;

wherein the elevator is disposed between the base and the slider; and wherein the slider is configured to apply a clamping force to a barrier when the base is secured to the structure.

2. The clamp apparatus of claim 1 further comprising at least one floor attachment assembly.

3. The clamp apparatus of claim 1 where the pusher assembly includes one or more thumb screws.

4. The clamp apparatus of claim 1 where the pusher assembly includes one or more ratcheting surfaces configured to engage and resist reverse displacement.

5. The clamp apparatus of claim 1 where the pusher assembly further includes a pad.

6. The clamp apparatus of claim 1 where the slider further includes a horizontal adjuster.

7. The clamp apparatus of claim 6 where the horizontal adjuster is a ratchet and a handle.

* * * * *